(12) United States Patent
Suzuki et al.

(10) Patent No.: US 12,337,648 B2
(45) Date of Patent: Jun. 24, 2025

(54) VEHICLE CONTROL DEVICE AND VEHICLE CONTROL METHOD

(71) Applicant: Nissan Motor Co., Ltd., Kanagawa (JP)

(72) Inventors: Masayasu Suzuki, Kanagawa (JP); Keiko Shishido, Kanagawa (JP); Tomoki Hirabayashi, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 18/716,108

(22) PCT Filed: Dec. 6, 2021

(86) PCT No.: PCT/IB2021/000847
§ 371 (c)(1),
(2) Date: Jun. 3, 2024

(87) PCT Pub. No.: WO2023/105256
PCT Pub. Date: Jun. 15, 2023

(65) Prior Publication Data
US 2025/0033431 A1    Jan. 30, 2025

(51) Int. Cl.
*B60H 1/00* (2006.01)
*G06Q 10/0832* (2023.01)
*B60H 3/00* (2006.01)
*G06Q 10/08* (2023.01)
*G06Q 10/083* (2023.01)

(52) U.S. Cl.
CPC ..... *B60H 1/00378* (2013.01); *B60H 1/00021* (2013.01); *G06Q 10/0832* (2013.01); *B60H 2001/00135* (2013.01); *B60H 3/0085* (2013.01); *G06Q 10/08* (2013.01); *G06Q 10/083* (2013.01)

(58) Field of Classification Search
CPC ............ B60H 1/00378; B60H 1/00021; B60H 3/0085; B60H 2001/00135; G06Q 10/0832; G06Q 10/08; G06Q 10/083; A61L 2209/16; A61L 2209/11
See application file for complete search history.

(56) References Cited

U.S. PATENT DOCUMENTS 5,865,971 A * 2/1999 Sunkara ............... G01N 27/283
                                                        277/910
6,298,291 B1 * 10/2001 Davis, Jr. ............... B60H 1/008
                                                        454/75

(Continued)

FOREIGN PATENT DOCUMENTS

CN    107599987 A    1/2018
CN    111746452 A    10/2020
(Continued)

*Primary Examiner* — Raheena R Malik
(74) *Attorney, Agent, or Firm* — Osha Bergman Watanabe & Burton LLP

(57) ABSTRACT

A vehicle control device is used for a vehicle that transports a user and a package. The vehicle control device includes a controller configured to: acquire an attribute of the user and an attribute of the package; partition a space in the vehicle into spaces prior to loading of at least one of the user and the package into the vehicle; and perform air conditioning control according to the attribute of an object for loading in at least one of the partitioned spaces.

13 Claims, 9 Drawing Sheets

(56) References Cited

U.S. PATENT DOCUMENTS

| | | | |
|---|---|---|---|
| 7,568,516 B2 * | 8/2009 | Bergqvist | F28F 27/00 |
| | | | 73/865.9 |
| 10,093,252 B2 | 10/2018 | Zych | |
| 10,471,804 B1 * | 11/2019 | Wengreen | B60H 1/00828 |
| 10,744,965 B2 | 8/2020 | Zych | |
| 11,337,404 B2 * | 5/2022 | Seta | A01K 1/0236 |
| 11,548,457 B2 | 1/2023 | Zych | |
| 11,634,062 B1 * | 4/2023 | Roy | B60H 1/00742 |
| | | | 296/24.41 |
| 11,981,245 B1 * | 5/2024 | Roy | B60H 1/004 |
| 2016/0215993 A1 * | 7/2016 | Balkhair | F24F 11/70 |
| 2017/0282821 A1 * | 10/2017 | Zych | B60R 16/037 |
| 2018/0290610 A1 * | 10/2018 | Zych | B60W 50/0098 |
| 2019/0066038 A1 * | 2/2019 | O'Brien | G05D 1/0088 |
| 2019/0233112 A1 * | 8/2019 | Seta | A01K 1/0047 |
| 2020/0101812 A1 * | 4/2020 | Terai | B60H 1/00207 |
| 2020/0171915 A1 * | 6/2020 | Sakurai | B60H 1/00864 |
| 2020/0290686 A1 * | 9/2020 | Suzuki | B62D 63/02 |
| 2020/0298649 A1 * | 9/2020 | Gutowski | B60H 1/00764 |
| 2020/0307608 A1 * | 10/2020 | Yamanaka | B60W 10/30 |
| 2020/0361406 A1 * | 11/2020 | Zych | G06Q 50/40 |
| 2021/0300153 A1 * | 9/2021 | Porter | B60H 3/0608 |
| 2021/0309074 A1 * | 10/2021 | Mizuno | B60H 1/00778 |
| 2021/0323384 A1 * | 10/2021 | Sakai | B60H 1/00985 |
| 2021/0354642 A1 * | 11/2021 | Onodera | B60H 1/00371 |
| 2022/0250443 A1 * | 8/2022 | Tomizawa | B60H 1/00742 |
| 2023/0226883 A1 * | 7/2023 | Lee | B60H 1/00792 |
| | | | 454/75 |

FOREIGN PATENT DOCUMENTS

| | | |
|---|---|---|
| JP | 2001-239820 A | 9/2001 |
| JP | 2019-514112 A | 5/2019 |
| JP | 2019-156216 A | 9/2019 |
| JP | 2020-147072 A | 9/2020 |
| JP | 2020-157943 A | 10/2020 |
| JP | 2021-165089 A | 10/2021 |
| JP | 2021-169270 A | 10/2021 |
| KR | 20210054411 A * | 5/2021 |

* cited by examiner

FIG. 9
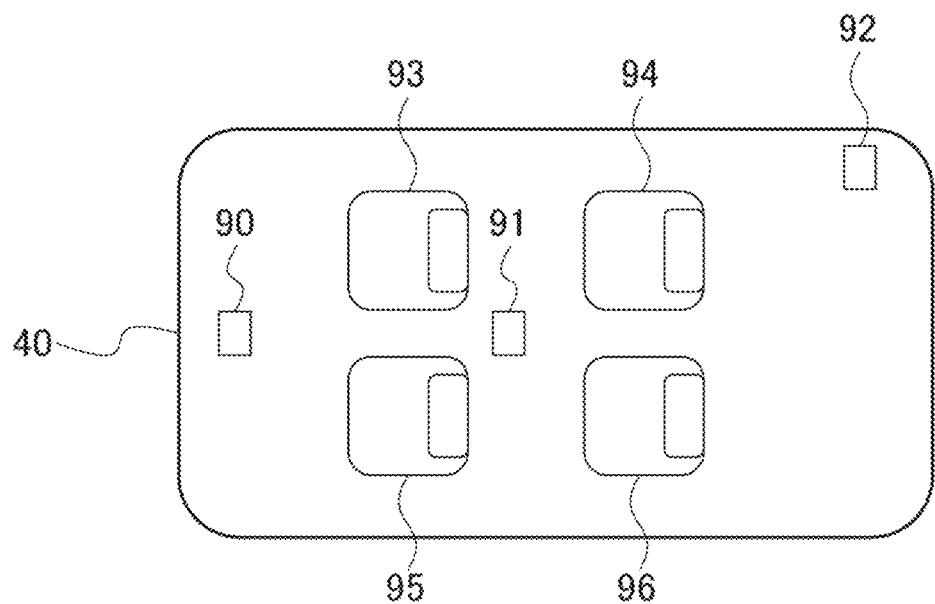
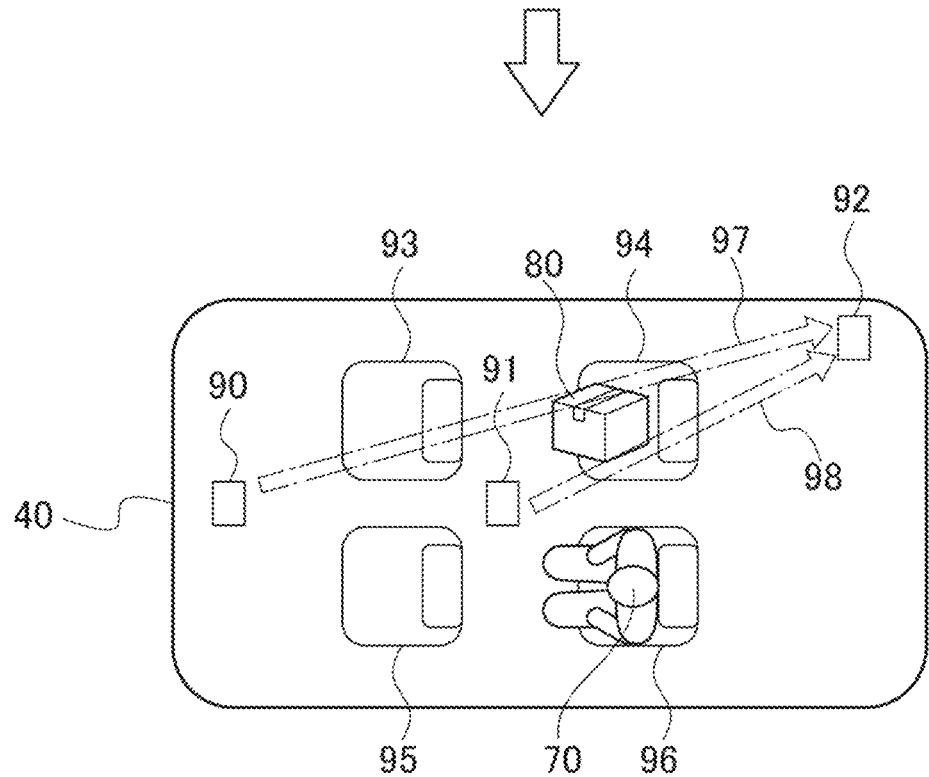

a vehicle control device
and a vehicle control method.

BACKGROUND ART

Conventionally, there has been known an invention for controlling an apparatus (for example, an air conditioning system) of a vehicle before a user is loaded in a vehicle (Patent Literature 1). The invention described in Patent Literature 1 controls an air conditioning system based on an input by a user before the vehicle arrives at a place to be loaded into a vehicle to load the user into the vehicle.

CITATION LIST

Patent Literature

Patent Literature 1: Japanese Unexamined Patent Application Publication No. 2019-514112

SUMMARY OF INVENTION

Problems to be Solved by Invention

However, the invention described in Patent Literature 1 does not consider the attributes of both the user and the package, although it is necessary to perform air conditioning control in consideration of the attributes of both the user and the package in the case of mixed transportation of passenger and freight in which the user and the package are transported and moved together. This may cause inconvenience to an object to be loaded.

The present invention has been made in view of the above-described problem, and an object the invention is to provide a vehicle control device and a vehicle control method capable of avoiding inconvenience to an object to be loaded.

Solution to Solve Problems

A vehicle control device in accordance with an embodiment of the present invention acquires an attribute of a user and an attribute of a package, partitions a space in a vehicle into spaces prior to loading of at least one of the user and the package into the vehicle, and performs air conditioning control according to the attribute of an object for loading in at least one of the partitioned spaces.

Effects of Invention

According to the present invention, it is possible to avoid inconvenience caused to an object to be loaded.

BRIEF DESCRIPTION OF DRAWINGS

FIG. 9 is a diagram illustrating an example of an air conditioning control method.

DESCRIPTION OF EMBODIMENTS

Embodiments of the present invention will now be described with reference to the drawings. In the description of the drawings, the same reference signs are used for the same parts, and the description thereof is omitted.

Figure 1:
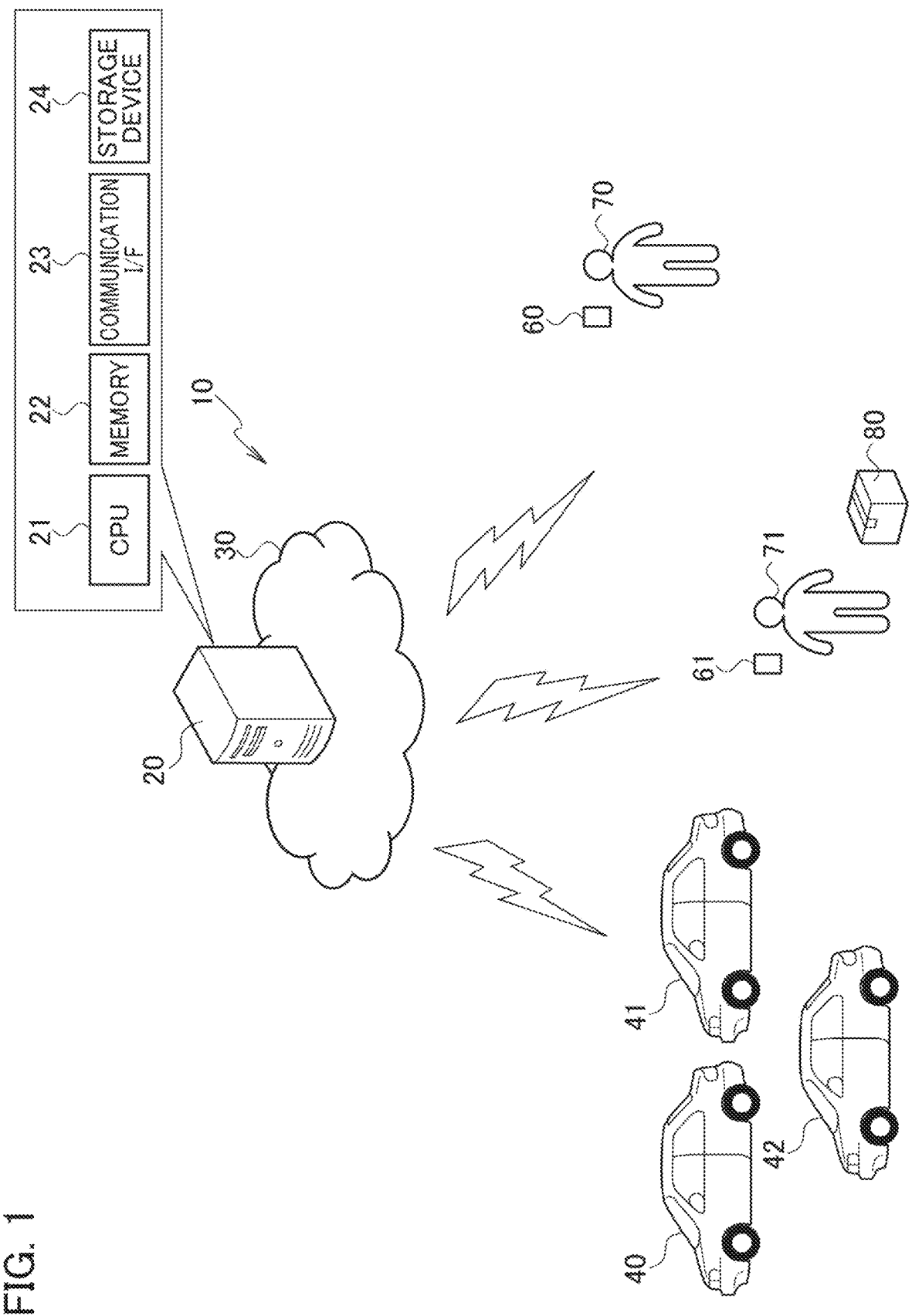
FIG. 1 is a schematic diagram of a system according to an embodiment of the present invention.

A configuration example of the system 10 according to the embodiment will be described with reference to FIGS. 1 and 2. As illustrated in FIG. 1, the system 10 includes a management server 20, a communication network 30, vehicle 40 to 42, a user 70, a communication device 60 owned by the user 70, a package operator 71, a communication device 61 owned by the package operator 71, and a package 80 handled by the package operator 71. FIG. 1 shows three vehicles, but the number of vehicle is not limited thereto. The system 10 may include four or more vehicles.

In this embodiment, the user 70 and the package 80 are loaded in the same vehicle. Such a form is referred to as "integration of passenger and freight transport". More specifically, "integration of passenger and freight transport" is defined as "a form of a transportation of freight and passengers, and an operation together". "Freight" is defined as "goods carried by a transportation means". "Transportation means" includes railways, buses, taxis, aircraft, ships, and the like. In this embodiment, "transportation means" is described as a vehicle. "Goods" refers mainly to package and parcel, the size of which is limited to those which can be loaded in a vehicle. "Goods" include animals (pets), plants, food and general merchandise. "Food" includes food that requires refrigeration (refrigerated food), food that requires freezing (frozen food), and fresh food that requires proper temperature control. In the "integration of passenger and freight transport", a space for passengers to stay and a space for freight to be loaded are usually clearly separated. In this embodiment, the transportation means is a vehicle, and a seat where passengers sit and a seat where cargo is loaded are clearly separated. Hereinafter, "goods" are referred to as package, and "passengers" are referred to as users. "Package operators" include pet shop employees, flower shop employees, lunch box shop employees, and internet supermarket employees. An internet supermarket is a service that accepts orders via the internet and delivers items directly to homes. In English-speaking countries, an internet supermarket is called an online supermarket or an online grocery. The "packages" in this embodiment includes pets, flowers, lunch boxes, and food items (including fresh food).

The management server 20 communicates with the vehicle 40 to 42 and the communication device 60 to 61 via the communication network 30. The management server 20 is a general-purpose computer (controller) including a central processing unit (CPU) 21, a memory 22, a communication I/F 23, and a storage device 24, and these components are electrically connected one another via a bus or the like (not illustrated). The management server 20 is used for the dispatch service of the vehicle 40 to 42. The location of the management server 20 is not particularly limited, but for example, the management server 20 is installed in a management center of an operator operating the vehicle 40 to 42.

The CPU 21 reads various programs stored in the storage device 24 and the like into the memory 22 and executes various commands contained in the programs. The memory 22 is a storage medium such as Read Only Memory (ROM) and Random Access Memory (RAM). The storage device 24 is a storage medium such as Solid State Drive (SSD) and Hard Disk Drive (HDD). A part (or all) of the system 10 including the functions of the management server 20 described below may be provided by an application (such as Software as a Service (SaaS)) arranged on the communication network 30.

The communication I/F 23 is implemented as hardware such as a network adapter, various communication software, and a combination thereof, and can realize wired or wireless communication via a communication network 30 and the like. The communication I/F 23 functions as an input unit and an output unit for transmitting and receiving data.

The communication network 30 is described as the Internet without limiting to this, and other wireless communication systems may be employed. The management server 20, the vehicle 40 to 42, and the communication device 60, 61 are connected to the communication network 30 by the Internet.

An example of the vehicle 40 to 42 is a taxi. The vehicle 40 to 42 may be an ordinary vehicle with a driver present or an autonomous vehicle without a driver present. An autonomous vehicle without a driver present may be described as a robotic taxi or an unmanned taxi. In this embodiment, the vehicle 40 to 42 is described as an autonomous vehicle without a driver. As described above, the vehicle 40 to 42 is a vehicle for "integration of passenger and freight transport".

The user 70 requests a vehicle using the communication device 60. Similarly, the package operator 71 requests a vehicle using the communication device 61. A vehicle dispatch application (hereinafter simply referred to as a vehicle dispatch app) used for reserving a vehicle is installed in the communication device 60, 61, and the user 70 and the package operator 71 request a vehicle using the vehicle dispatch app.

Next, a detailed configuration of the management server 20, the vehicle 40, and the communication device 60 and 61 will be described with reference to FIG. 2. Although the vehicle 41, 42 is omitted in FIG. 2, the vehicle 41 and 42 has the same configuration as the vehicle 40.

Figure 2:
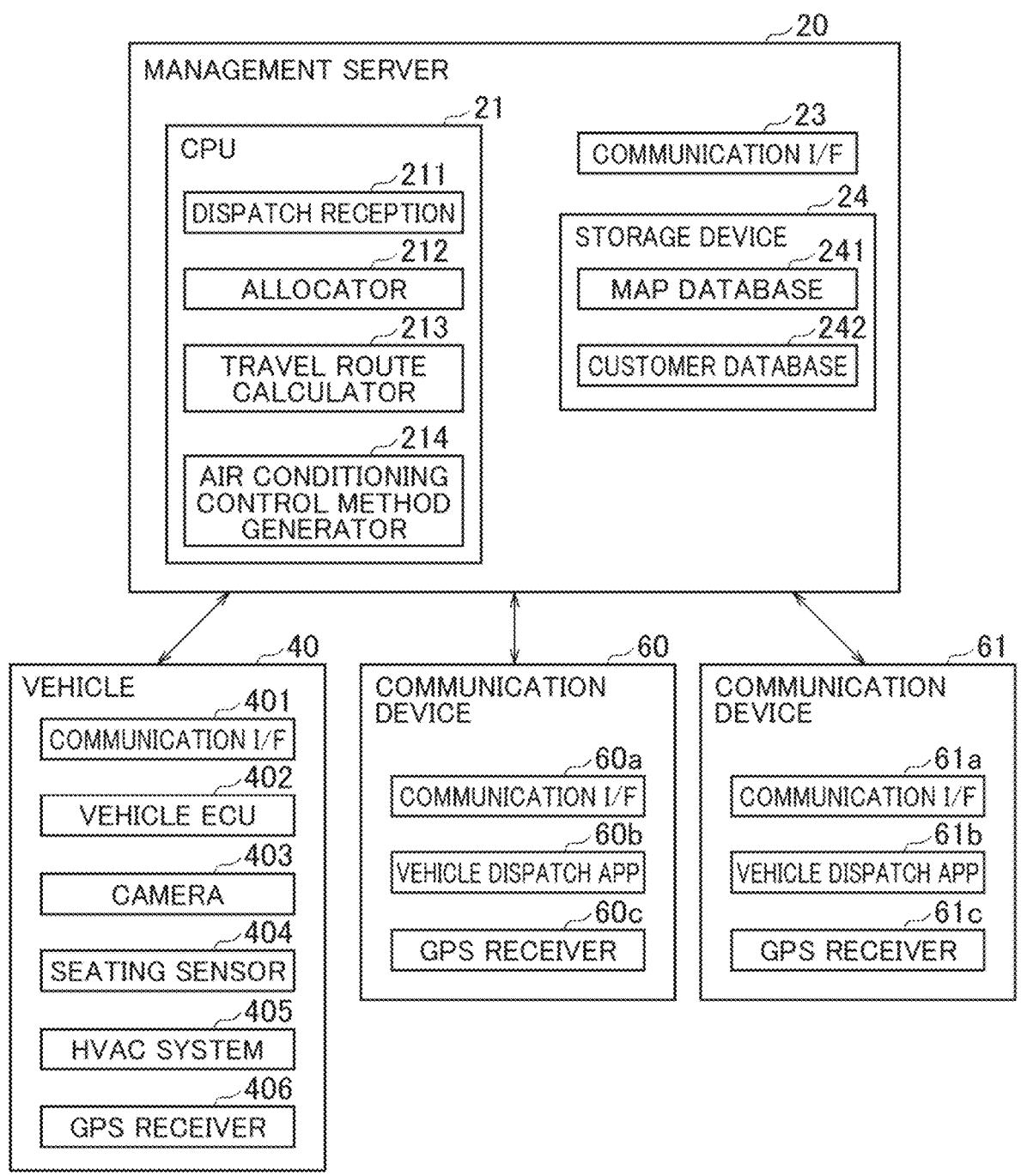
FIG. 2 is a functional block diagram of a management server, a communication device, a communication device, and a vehicle according to an embodiment of the present invention.

As illustrated in FIG. 2, the communication device 60 includes a communication I/F 60a, a vehicle dispatch app 60b, and a GPS receiver 60c. Similarly, the communication device 61 includes a communication I/F 61a, a vehicle dispatch app 61b, and a GPS receiver 61c. The communication I/F 60a and the communication I/F 61a have the same structure as the communication I/F 23, and communicate with the management server 20 via the communication network 30. As an example, the communication device 60, 61 is a portable terminal such as a smartphone or a tablet. The communication device 60, 61 may be a wearable device. Although not illustrated, the communication device 60, 61 includes a CPU, a memory, a storage device, and the like in the same manner as the management server 20.

The vehicle dispatch app 60b is used for vehicle requests as described above. The vehicle dispatch app 60b functions as a user interface when the user 70 requests a vehicle. The vehicle dispatch app 60b is realized by the CPU in the communication device 60 reading and executing a dedicated application program from a storage device in the communication device 60. When the user 70 uses the vehicle dispatch app 60b, that is, when requesting a vehicle, the user enters his/her own information into the vehicle dispatch app 60b in advance and registers it. Such pre-registration is a well-known technology and has been adopted in many applications. By performing pre-registration, unique identification information (also referred to as user ID, account ID, or the like.) is given to the user 70, and the user 70 can request a vehicle using the vehicle dispatch app 60b. The information to be entered in advance is, for example, the name, nickname, gender, address, telephone number, email address, payment method and attributes of the user 70.

The "attributes" to be registered in advance will now be described. The "attributes of the user 70" in this embodiment are information on the preference on the air in an interior of a vehicle. "Preference on the air in an interior of a vehicle" in this embodiment means the preference of the user 70 on the odor and temperature in an interior of the vehicle. If the user does not like something that emits an odor, this fact is registered as "preference information" in advance. As for the room temperature of the vehicle, the room temperature the user feels comfortable varies from user to user. The user 70 registers the temperature the user feels comfortable as "preference information" in advance. It is noted that the "temperature the user feels comfortable" may vary depending on the season. Therefore, the system may require the user 70 to enter a temperature for each season.

The package operator 71 also registers the attributes of the package 80 to be handled in advance. The "attributes of the package 80" are information on an odor of the package 80 and information on a temperature of the package 80. If the package 80 is a lunch box emitting an odor, the package operator 71 registers that the package 80 emits an odor. If the package 80 is fresh food, the package operator 71 registers that temperature needs to be controlled to 10 degrees or less.

In this embodiment, the air conditioning inside the vehicle is controlled according to "attributes of the user 70" and "attributes of the package 80." When there is a prescribed temperature difference between the temperature desired by the user 70 and registered as an attribute of the user 70 and the temperature required to be controlled and registered as an attribute of the package 80, the air conditioning control is performed. Further, the air conditioning control is performed when odor information is registered as either an attribute of the user 70 or an attribute of the package 80. When the attributes of the user 70 and the package 80 does not satisfy these conditions, the normal air conditioning control is performed. "Normal air conditioning control" refers to air conditioning control set in advance according to the outside temperature and the like.

After the pre-registration is completed, the user 70 enters a desired place to be loaded into the vehicle, desired time to be loaded into a vehicle, desired destination (place to be unloaded from a vehicle), desired arrival time, desired seat, and the like into the vehicle dispatch app 60b, and requests a vehicle. For example, the user 70 selects a desired seat from among available seats (unreserved seats). Selection of a seat is optional. When the user 70 does not select a seat, a seat is automatically selected by the management server 20. The vehicle dispatch app 60b transmits a vehicle dispatch request to the management server 20 according to an input of the user 70. Further, the communication device 60 displays various information (such as vehicle dispatch request receipt, estimated arrival time, estimated route) included in the signal returned from the management server 20 in response to the vehicle dispatch request on a display. However, the method of implementing the vehicle dispatch app 60b is not limited thereto. For example, the communication device 60 may access the server that provides the function of the vehicle dispatch app 60b, receive the function provision, and display the execution result of the function transmitted from the server by a browser. Similarly, after the pre-registration is completed, the package operator 71 enters the desired place to be loaded into the vehicle, desired time to be loaded into the vehicle, desired destination (place to be unloaded), desired arrival time, desired seat, and the like into the dispatch app 61b, and requests a vehicle.

The position information of the communication device 60 acquired by the GPS receiver 60c is transmitted to the management server 20 at any timing. Similarly, the position information of the communication device 61 acquired by the GPS receiver 61c is transmitted to the management server 20 at any timing.

As illustrated in FIG. 2, the vehicle 40 includes a communication I/F 401, a vehicle electronic control unit (ECU) 402, a camera 403, a seating sensor 404, a heating, ventilation, and air conditioning (HVAC) system 405, and a GPS receiver 406. The communication I/F 401 has the same configuration as the communication I/F 23 and communicates with the management server 20 via the communication network 30. The vehicle ECU 402 is a computer for controlling the vehicle 40. The vehicle ECU 402 controls various actuators (such as brake actuators, accelerator actuators, steering actuators) based on commands received from the management server 20. The camera 403 is installed in the interior of the vehicle 40. The camera 403 detects the seating position of the user 70 (the position of the seat on which the user 70 is seated). Further, the camera 403 detects the position of the seat on which the package 80 is placed. These positions may be detected by the seating sensor 404 instead of the camera 403. The HVAC system 405 controls the temperature, humidity, and airflow in the interior of the vehicle 40 and includes a cooling device, a heating device, a blower, and the like. The position information of the vehicle 40 acquired by the GPS receiver 406 is transmitted to the management server 20 at any timing.

As illustrated in FIG. 2, the CPU 21 of the management server 20 includes, as an example of a plurality of functions, a vehicle dispatch reception 211, an allocator 212, a travel route calculator 213, and an air conditioning control method generator 214. A map database 241 and a customer database 242 are stored in a storage device 24 of the management server 20.

The map database 241 stores map information necessary for a route guidance such as road information and facility information. The map information includes the number of lanes of a road, road width information, and road undulation information. Further, the map information includes road signs indicating speed limits, one-way traffic, crosswalks, and markings. The map information stored in the map database 241 may be high-precision map data (HD MAP) or normal map data (SD MAP).

The customer database 242 stores information (such as name, attributes) of the user 70 and the package operator 71, a vehicle usage history, and the like.

The vehicle dispatch reception 211 receives a vehicle dispatch request of the user 70 entered into the communication device 60 (vehicle dispatch app 60b). The vehicle dispatch reception 211 receives a vehicle dispatch request entered into the communication device 61 (vehicle dispatch app 61b) by the package operator 71. The vehicle dispatch reception 211 has a function of notifying the communication device 60 that the vehicle dispatch request of the user 70 has been received, the scheduled arrival time at the place to be loaded into the vehicle, the scheduled travel route to the destination, and the like. Similarly, the vehicle dispatch reception 211 has a function of notifying the communication device 61 that the vehicle dispatch request of the package operator 71 has been received, the scheduled arrival time at the place to be loaded into the vehicle, the scheduled travel route to the destination, and the like.

The vehicle dispatch reception 211 acquires position information of the user 70 from the communication device 60, acquires position information of the package operator 71 from the communication device 61, and acquires the position information of the vehicle 40 from the vehicle 40. "Position information of the user 70" means the position information of the communication device 60 possessed by the user 70. "Position information of the package operator 71" means the position information of the communication device 61 possessed by the package operator 71. The vehicle dispatch reception 211 outputs the acquired position information to the allocator 212 and the travel route calculator 213.

The allocator 212 allocates an appropriate vehicle from a plurality of vehicles 40 to 42 based on the received vehicle dispatch request. For example, the allocator 212 can allocate the vehicle closest to the desired place to be loaded into the vehicle for the user 70 or the package operator 71 from the plurality of vehicles 40 to 42 to improve efficiency. In this embodiment, a description is given, supposing that the vehicle 40 is allocated.

The travel route calculator 213 calculates the travel route from the current location of the vehicle 40 to the destination via the place to be loaded by referring to the location information obtained from the vehicle dispatch reception 211 and the map database 241. In this embodiment, it is assumed that the user 70 and the package 80 share a ride in order to improve the operation efficiency of the vehicle 40. Regarding the ride-sharing, it is possible to confirm with the user 70 and the package operator 71 whether to permit the ride-sharing, but the ride-sharing will be described as being permitted. If the destinations of the user 70 and the package 80 are in the same direction, the efficient operation of the vehicle 40 can be realized, but for the application of the present invention, the destinations need not be in the same direction. For any section of a path along which the vehicle 40 travels, there should be a section in which both the user 70 and the package 80 are loaded. It is not limited to a scene in which both the user 70 and the package 80 are loaded, as will be described later.

The air conditioning control method generator 214 acquires the attributes of the user 70 and the package 80 by referring to the customer database 242. The air conditioning control method generator 214 generates the air conditioning control method according to the attributes of the user 70 and the package 80. The air conditioning control method generator 214 transmits the generated air conditioning control method to the HVAC system 405.

Figure 3:
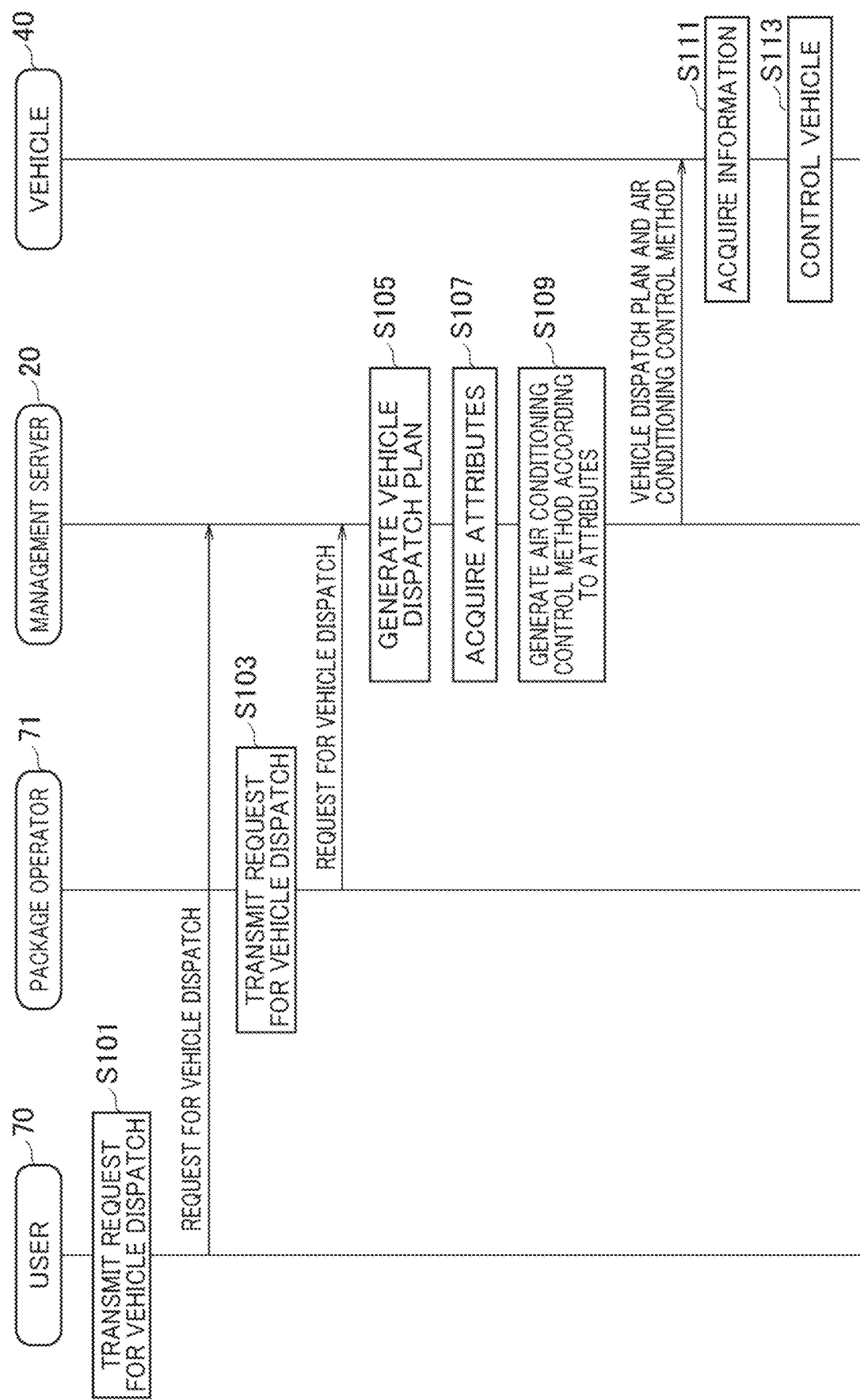
FIG. 3 is a sequence chart illustrating an operation example of a system according to an embodiment of the present invention.

Next, an operation example of the system 10 will be described with reference to a sequence charts of FIGS. 3 and 4. In step S101, the user 70 requests a vehicle using the communication device 60. A request signal is transmitted from the communication device 60 to the management server 20. In step S103, the package operator 71 requests a vehicle using the communication device 61. A request signal is transmitted from the communication device 61 to the management server 20. In step S105, the management server 20 allocates a vehicle and calculates a travel route based on the received request. The process continues to step S107 and the management server 20 acquires the attributes of the user 70 and the package 80 by referring to the customer database 242. The process continues to step S109 and the management server 20 generates an air conditioning control method according to the attributes of the user 70 and the package 80. The management server 20 transmits a vehicle dispatch plan including a travel route and the like, and the air conditioning control method to the vehicle 40.

Figure 5:
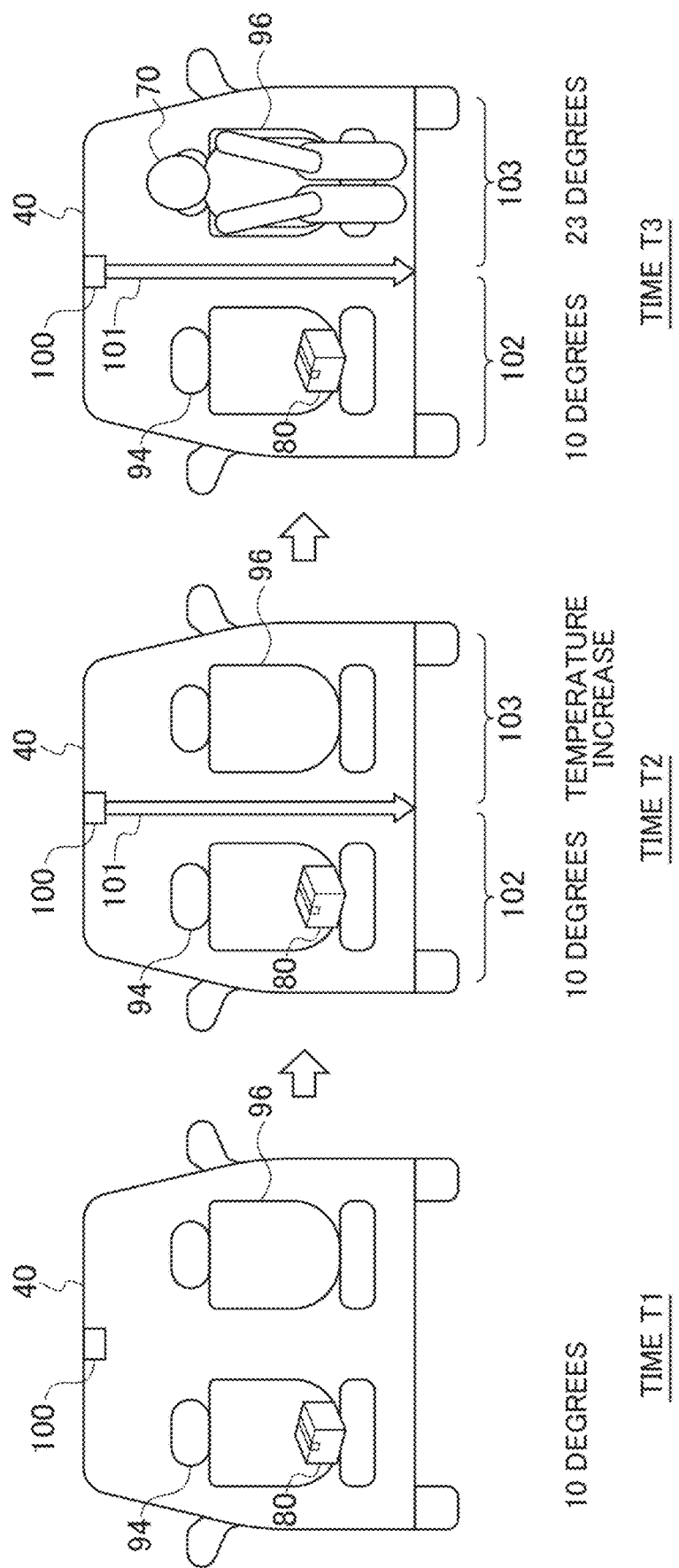
FIG. 5 is a diagram illustrating an example of an air conditioning control method.

In step S111, the vehicle 40 acquires the vehicle dispatch plan and the air conditioning control method from the management server 20. The process continues to step S113 and the vehicle ECU 402 controls various actuators to allow the vehicle 40 travel along the travel path. In step S115, the vehicle 40 heads to a desired loading place of the package 80 and loads the package 80. The process continues to step S117 and the camera 403 or the seating sensor 404 detects the position of the seat on which the package 80 is placed. An example will now be described with reference to FIGS. 5 and 9 for a position of the seat on which the package 80 detected by the camera 403 or the seating sensor 404 is placed. FIG. 9 shows the interior of the vehicle 40. Reference signs 90 and 91 denote air conditioning control devices with an HVAC system 405 including a cooling device, a heating device, a blower, and the like. Reference sign 92 denotes an exhaust port. Reference signs 93 to 96 denotes a seat. It is assumed that the package 80 is placed on the seat 94 as illustrated in FIG. 5. The process continues to step S119 and the space partitioning is started based on the position of the seat 94 on which the package 80 is placed and the seat on which the user 70 loaded later will sit. Information on the position of the seat is included in the vehicle dispatch plan when the seat on which the user 70 will sit and the seat on which the package 80 is placed are determined by the management server 20. In this case, the management server 20 can recognize the seat on which the user 70 will sit and the seat on which the package 80 is placed before the user 70 and the package 80 are loaded. It is assumed that the seat on which the user 70 loaded later will sit is the seat 96 illustrated in FIG. 5. "Space partitioning" means blocking a space between the package 80 and the user 70 with air flow. "Space partitioning" is implemented by an air curtain as an example. In FIG. 5, reference sign 100 denotes an air curtain generator (a type of HVAC system 405), and reference sign 101 denotes an air curtain generated from the air curtain generator 100. An "air curtain" generates a film of fast air flow to block air movement. The term "block" is used not only to completely block air movement but also to suppress the air movement. The "air curtain" is provided to block air conditioning and prevent the intrusion of odors, enabling a use of a space without providing walls. The air curtain 101 in this embodiment generates a film of airflow from a ceiling to a floor.

Figure 4:
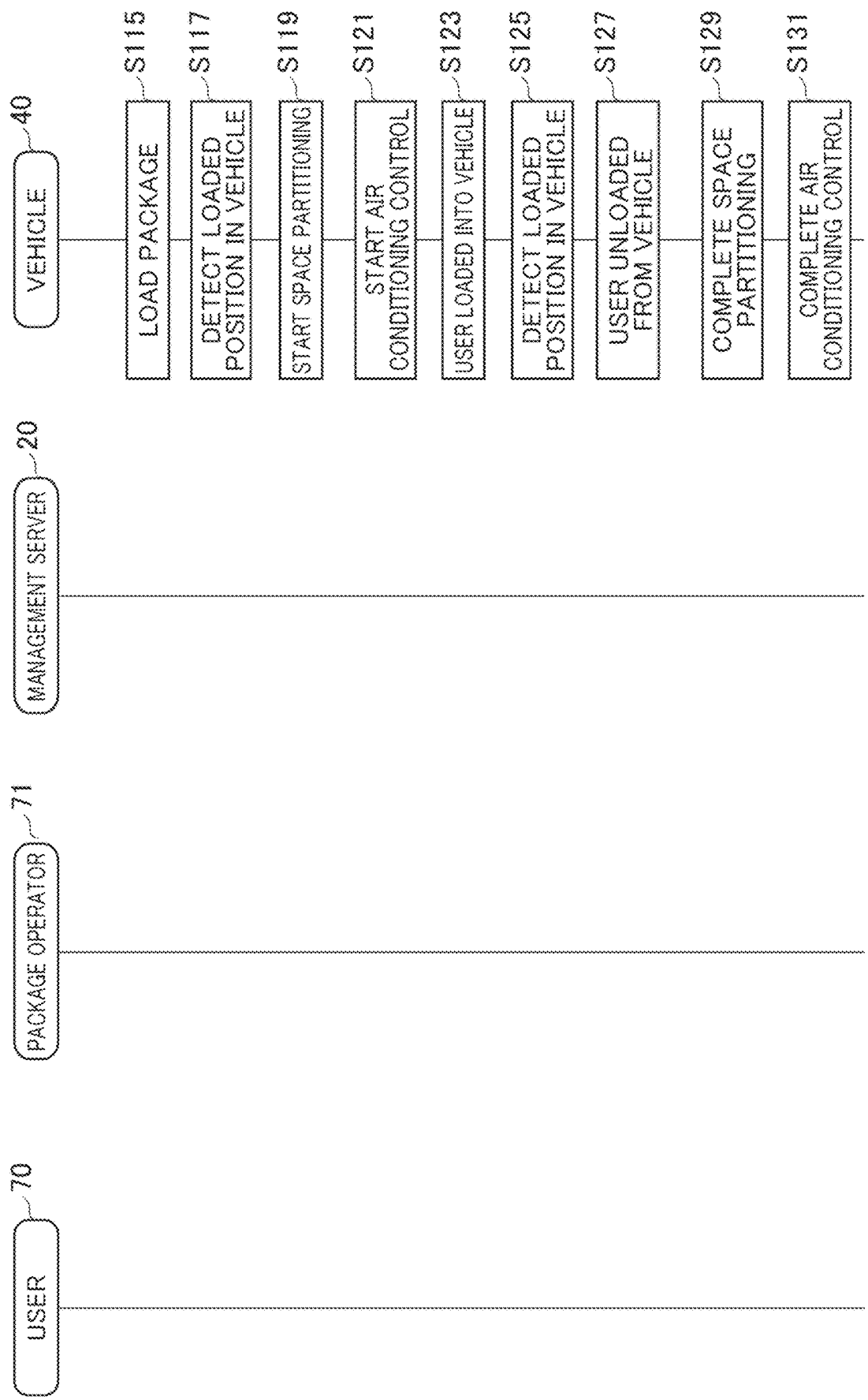
FIG. 4 is a sequence chart illustrating an operation example of a system according to an embodiment of the present invention.

At time T1 in FIG. 5, the package 80 is loaded before the user 70 (step S115 in FIG. 4). The package 80 is a fresh food. That is, it is assumed that the temperature control of 10 degrees or less is registered as an attribute of the package 80. The temperature of the package 80 is 10 degrees when the package 80 is loaded. The package 80 needs to be maintained at 10 degrees or less. That is, the room temperature of the vehicle 40 needs to be maintained at 10 degrees or less. Here, it is assumed that the information that the user 70 loaded into the vehicle later wants the room temperature to be 23 degrees is registered as an attribute. In this case, the request of the user 70 cannot be satisfied if the air conditioning is controlled so that the room temperature is 10 degrees or less. On the contrary, the request of the package 80 cannot be satisfied if the air conditioning is controlled so that the room temperature is 23 degrees. Therefore, when there is a prescribed temperature difference between the room temperature (10 degrees) required for the package 80 and the room temperature (23 degrees) required by the user 70, the space in the vehicle is partitioned and the air conditioning is controlled in order to avoid the inconvenience caused to an object to be loaded (the user 70 and the package 80). The "prescribed temperature difference" is not particularly limited, but is, for example, 5 degrees or more. In the example illustrated in FIG. 5, an air curtain 101 is generated at time T2 to partition the space in the interior into two regions (region 102 and region 103) (step S119 in FIG. 4), since an air conditioning control is required after partitioning the space. The region 102 is cooled by a cooling device and controlled to be 10 degrees or less (step S121 in FIG. 4). On the other hand, the region 103 is warmed by a heating device and the temperature increases (step S121 in FIG. 4). Whether the air conditioning control is necessary after partitioning the space is determined according to the attributes of the user 70 and the package 80. The timing at which the "space partitioning" is performed, that is, the timing at which the air curtain 101 is generated, is a prescribed distance before the desired place to be loaded into the vehicle for the user 70 or a prescribed time before the user 70 arrives at the desired place be loaded into the vehicle. At time T3, the vehicle 40 heads to the desired place to be loaded into the vehicle for the user to load the user 70 into the vehicle. When the user 70 is loaded into the vehicle, the temperature of the space (region 103) for the seat 96 on which the user 70 will sit is 23 degrees. 23 degrees is the temperature desired by the user 70. This improves the comfort of the user 70 when loaded into the vehicle and traveling, and also maintains the freshness of the package 80. Thus, according to this embodiment, it is possible to avoid the inconvenience caused to an object to be loaded (the user 70 and the package 80) by controlling the air conditioning by partitioning a space in the vehicle a plurality of spaces.

In step S125 in FIG. 4, the camera 403 or the seat sensor 404 detects the position of the seat 96 on which the user 70 is seated. This detection is performed to confirm that the user 70 is loaded in the vehicle. After the user 70 is unloaded from the vehicle, the air curtain 101 is released, and the air conditioning control is completed (step S127 to 131). The control of the air curtain 101 and the temperature management control are included in the air conditioning control method acquired from the management server 20. The method of partitioning a space in a vehicle into a plurality of spaces is not limited to the air curtain 101. For example, in place of the air curtain 101, a physical shield such as a shutter or a partition board may be provided to partition a space in the vehicle into a plurality of spaces.

Figure 6:
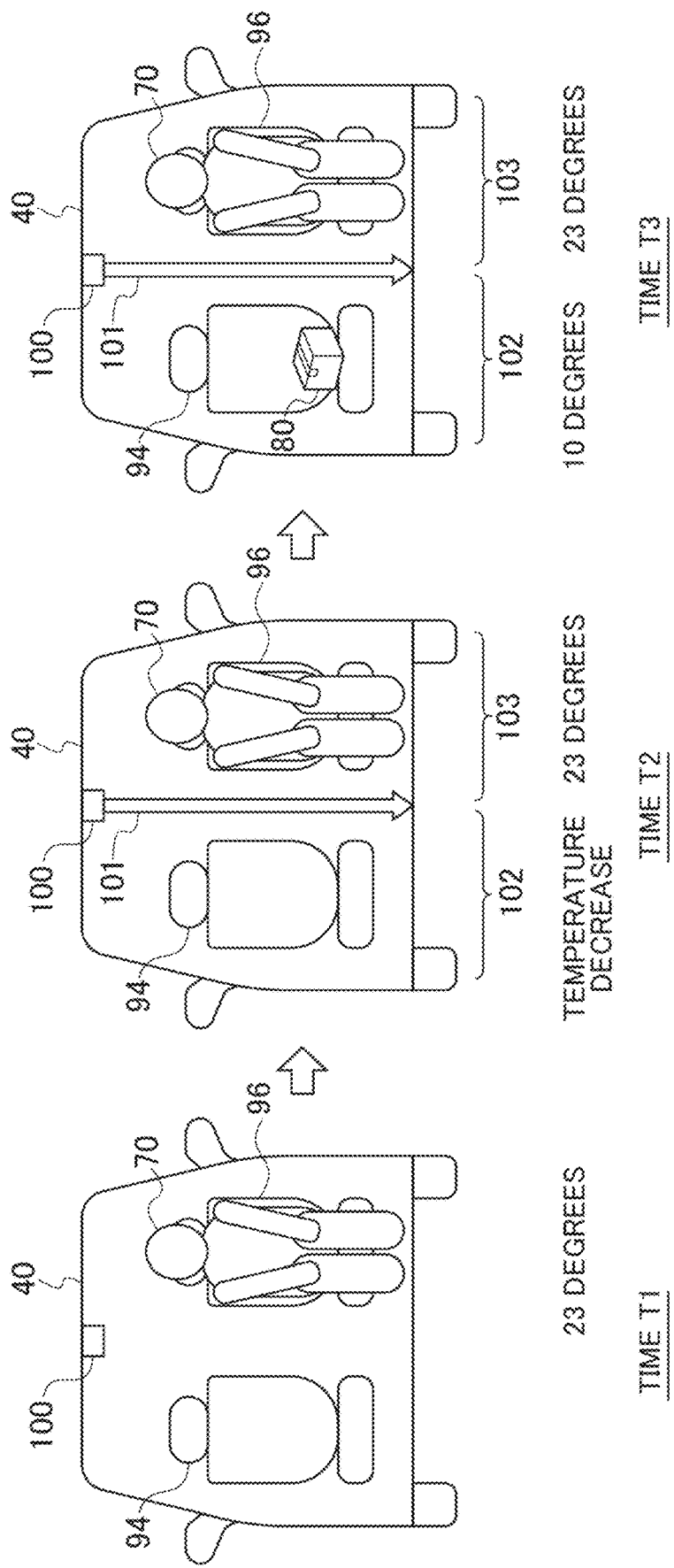
FIG. 6 is a diagram illustrating an example of an air conditioning control method.

In FIG. 5, a case in which the package 80 is loaded first and then the user 70 is loaded into the vehicle is described. Referring now to FIG. 6, a case in which the user 70 is loaded first and then the package 80 is loaded into the vehicle will be described. At time T1 in FIG. 6, the vehicle 40 heads to a desired place be loaded into the vehicle for the user 70 and loads the user 70. The interior temperature is controlled to 23 degrees since the temperature desired by the user 70 is 23 degrees. In FIG. 6 as well as in FIG. 5, it is determined that air conditioning control is necessary after partitioning the space by the attributes of the user 70 and the package 80. Therefore, as illustrated in time T2, an air curtain 101 is generated before a prescribed distance of the desired loading place of the package 80 or before a prescribed time of arrival at the desired loading place of the package 80, and the space in the interior is partitioned into two regions (region 102 and region 103). When the space is partitioned, the user 70 is notified of this. The purpose of this is not to surprise the user 70 and not to disturb the air conditioning control by the user 70. A notification method to the user 70 may be a voice guidance or a display guidance. The region 103 is heated by a heating device and the temperature is kept at 23 degrees. On the other hand, the region 102 is cooled by a cooling device and the temperature is lowered. At time T3, the vehicle 40 heads to the desired loading place of the package 80, and the package 80 is loaded. When the package 80 is loaded, the temperature of the space (region 102) for the seat 94 on which the load 80 is placed is 10 degrees. Thus, the freshness of the package 80 is maintained and the user 70 can enjoy a comfortable interior environment without being affected by the low temperature in the region 102. Thus, according to the present embodiment, it is possible to avoid the inconvenience caused to an object to be loaded (the user 70 and the package 80) regardless of the order to be loaded into the vehicle 40. After unloading the package 80, the user 70 is notified to release the air curtain 101. Thereafter, the air curtain 101 is released and the air conditioning control is completed.

Figure 7:
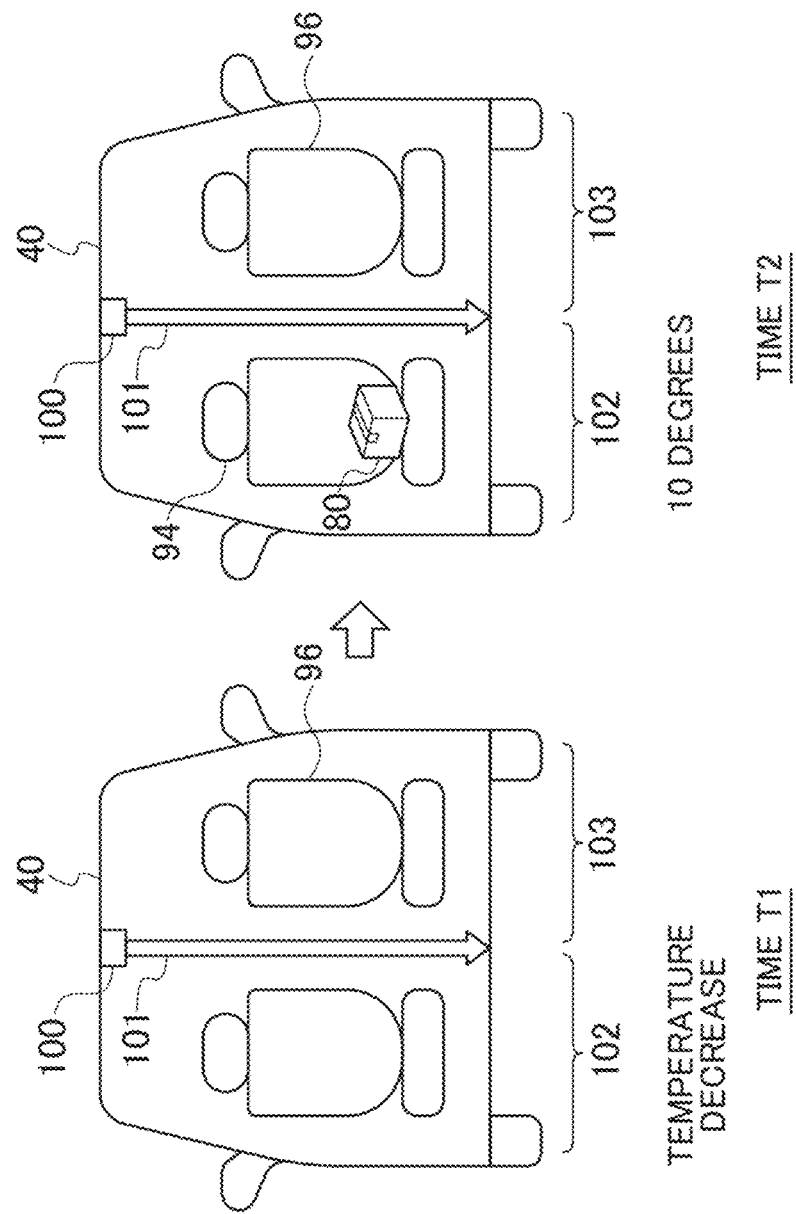
FIG. 7 is a diagram illustrating an example of an air conditioning control method.
Figure 8:
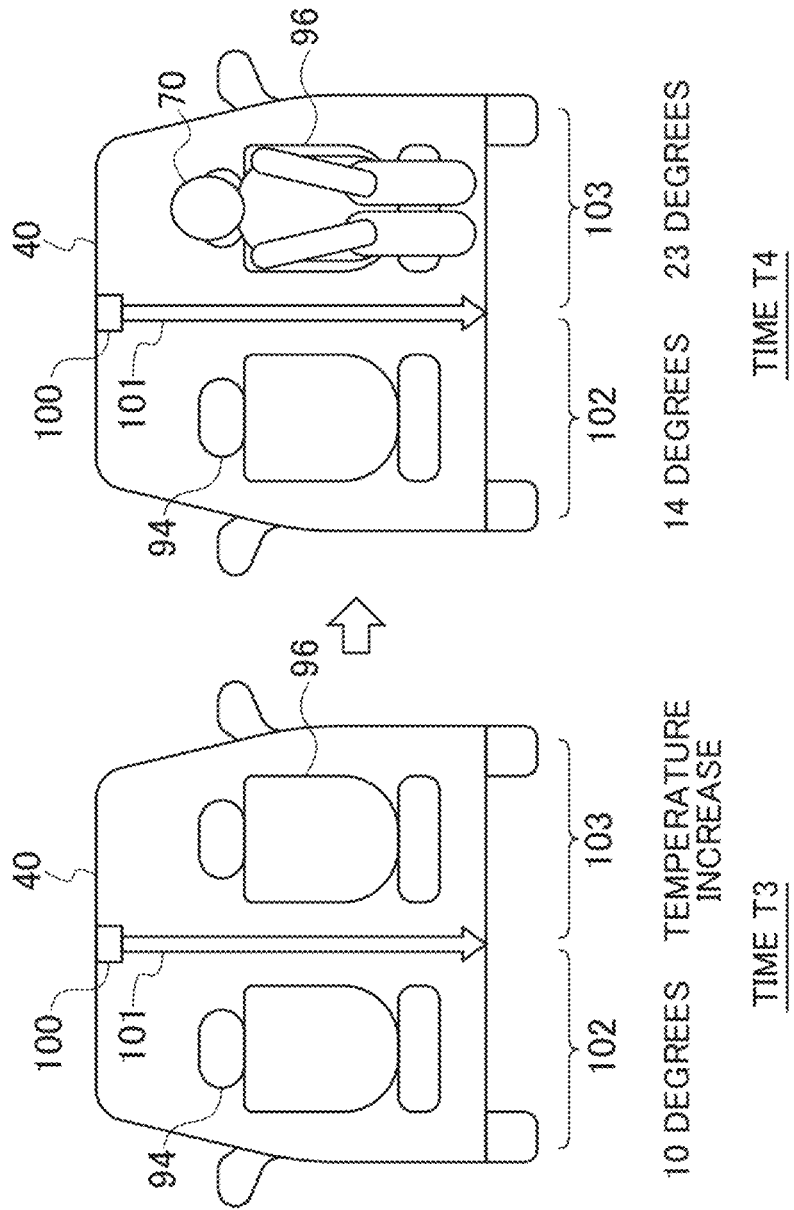
FIG. 8 is a diagram illustrating an example of an air conditioning control method.

In FIGS. 5 and 6, there is a time period in which both the user 70 and the package 80 are simultaneously loaded into the vehicle 40. Referring now to FIGS. 7 and 8, a case in which the user 70 and the package 80 are not simultaneously loaded into the vehicle 40 will be described. As it is determined that the attributes of the user 70 and the package 80 require air conditioning control with space partitioning at time T1 in FIG. 7, an air curtain 101 is generated to partition the interior space into two regions (region 102 and region 103) a prescribed distance before the desired loading place of the package 80 or a prescribed time before the arrival time of the package 80 at the desired loading place. The region 102 is cooled by the cooling device, and the temperature decreases. The air conditioning control is not performed on the region 103. The air conditioning control at this timing results in loss of energy since the timing at which the user 70 is loaded into the vehicle is later in time. At time T2, the vehicle 40 heads to the desired loading place of the package 80, and the package 80 is loaded. The temperature of the space (region 102) for the seat 94 in which the package 80 is placed is 10 degrees when the package 80 is loaded. At time T3, the package 80 is unloaded. The region 103 is heated by a heating device and the temperature is increased before a prescribed distance from the desired place to be loaded into the vehicle for the user 70 or a prescribed time before the time when the user 70 arrives at the desired place to be loaded into the vehicle. At time T4, the vehicle 40 heads to the desired place to be loaded into the vehicle for the user 70 to load the user 70 into the vehicle. The temperature of the space (region 103) for the seat 96 on which the user 70 will sit is 23 degrees when the user 70 is loaded into the vehicle. In the region 102, the temperature gradually increases (14 degrees at time T4) since the cooling control is completed. The air curtain 101 may be released when the temperature in the region 102 increases to a temperature that does not affect the interior temperature even if the air curtain 101 is released.

The air may be blown from the blower 90 and 91 toward an exhaust port 92 as illustrated in FIG. 9 after the air curtain 101 partitions the space when odor information is registered in either the attribute of the user 70 or the attribute of the package 80. Thus, the influence of the odor of the package 80 (lunch box) on the user 70 can be reduced when a lunch box emitting an odor is registered as an attribute of the package 80. The air curtain 101 is not illustrated in FIG. 9. It should be noted that reducing an influence on the user 70 includes a case in which there is no influence on the user 70.

(Operation and Effect)

As described above, according to this embodiment, the following operation and effect can be obtained.

The management server 20 (controller) acquires the attributes of the user 70 and the attributes of the package 80. Acquisition of the attributes is implemented by referring to the customer database 242. The management server 20 partitions a space in a vehicle into a plurality of spaces before at least one of the user 70 and the package 80 is loaded into the vehicle. The management server 20 performs an air conditioning control according to the attributes of an object to be loaded into at least one of the plurality of partitioned spaces. This makes it possible to avoid the inconvenience caused to the object to be loaded (user 70 and package 80). In FIGS. 5 to 8, the space in the vehicle is partitioned into two, but is not limited thereto. The space in the vehicle may be partitioned into three or more spaces.

The attributes of the user 70 include information on the temperature in the interior of the vehicle or information on the odor in the interior of the vehicle. The attributes of the package 80 include information indicating that temperature control is required or information on the odor. The management server 20 performs air conditioning control according to the attributes when it is determined that there is a prescribed temperature difference between the temperature included in the attributes of the user 70 and the temperature included in the attributes of the package 80, or when either the attributes of the user 70 or the attributes of the package 80 include information on the odor. Thus, as described in FIGS. 5 to 8, the comfort of the user 70 is improved, and the freshness of the package 80 is also maintained. Thus, it is possible to avoid the inconvenience caused to an object to be loaded (user 70 and package 80).

A transportation plan of the user 70 and the package 80 may include that the user 70 and the package 80 are simultaneously loaded into the vehicle.

The transportation plan of the user 70 and the package 80 may include that one of the user and the package is unloaded from the vehicle and then the other is loaded into the vehicle.

The position on which the user 70 sits and the position on which the package 80 is loaded can be separated by a partition (air curtain 101) as illustrated in FIGS. 5 to 8.

The management server 20 blocks the space in the vehicle by airflow or alternatively blocks the space in the vehicle by use of a physical device. This makes it possible to avoid the inconvenience caused to an object to be loaded (user 70 and package 80).

The management server 20 may partition a space in the vehicle into a plurality of spaces while one of the user 70 or the package 80 is loaded into the vehicle and before the other is loaded into the vehicle (sees FIGS. 5 and 6).

The management server 20 may partition a space in the vehicle into a plurality of spaces after one of the user 70 or the package 80 is unloaded from the vehicle, and before the other is loaded into the vehicle (see FIGS. 7 and 8).

The management server 20 may partition a space in the vehicle into a plurality of spaces before both the user 70 and the package 80 are loaded into the vehicle (see FIG. 7).

Depending on the size of the package 80, the package 80 may not fit in the seat and may be placed across the seats. The management server 20 may prohibit control according to the attributes when it is impossible to partition the space in the vehicle as described.

Each of the functions described in the above embodiments may be implemented by one or more processing circuits. The one or more processing circuits include a programmed processing device such as a processing device including an electric circuit. Further, the one or more processing circuits include a device such as an application-specific integrated circuit (ASIC) or circuit component arranged to perform each of the described functions.

Although embodiments of the present invention have been described above, the statements and drawings that form a part of this disclosure should not be understood as limiting the present invention. The present disclosure will reveal to those skilled in the art a variety of alternative embodiments, embodiments, and operational techniques.

Although the management server 20 is described as a vehicle control device, the vehicle control device is not limited to the management server 20. The configuration and functions of the management server 20 may be mounted on the vehicle 40. In this case, the controller mounted on the vehicle 40 functions as a vehicle control device.

REFERENCE SIGNS LIST

20 management server
211 vehicle dispatch reception
212 allocator
213 travel route calculator
214 air conditioning control method generator

The invention claimed is:

1. A vehicle control device used for a vehicle that transports a user and a package, the vehicle control device comprising a controller,
   wherein the controller is configured to:
   acquire an attribute of the user including information registered in advance on an odor in an interior of the vehicle and an attribute of the package including information registered in advance on an odor of the package;
   partition a space in the vehicle into spaces prior to loading of at least one of the user and the package into the vehicle; and
   perform air conditioning control according to the attribute of the user and the attribute of the package, the user and the package being objects each for loading in at least one of the partitioned spaces,
   wherein the controller is configured to receive the information from a communication device via a communication network,
   wherein the communication device is configured to receive the information as an input from the user, and
   wherein the communication device comprises a communication interface.

2. The vehicle control device according to claim 1, wherein
   the attribute of the user includes information on an odor in the interior,
   and
   the controller is configured to perform the air conditioning control according to the attributes upon either the attribute of the user or the attribute of the package including the information on the odor.

3. The vehicle control device according to claim 1, wherein a transportation plan for the user and the package includes simultaneous loading of the user and the package into the vehicle.

4. The vehicle control device according to claim 1, wherein a transportation plan for the user and the package includes that one of the user and the package is unloaded from the vehicle and then the other is loaded into the vehicle.

5. The vehicle control device according to claim 1, wherein a position on which the user sits and a position on which the package is loaded is separable by a partition.

6. The vehicle control device according to claim 1, wherein the controller is configured to block the space in the vehicle by airflow or block the space in the vehicle by use of a physical device.

7. The vehicle control device according to claim 3, wherein the controller is configured to partition the space in the vehicle into the spaces while one of the user or the package is in the vehicle and before the other is loaded into the vehicle.

8. The vehicle control device according to claim 4, wherein the controller is configured to partition the space in the vehicle into the spaces after one of the user or the package is unloaded from the vehicle and before the other is loaded into the vehicle.

9. The vehicle control device according to claim 1, wherein the controller is configured to partition the space in the vehicle into the spaces before both the user and the package are loaded into the vehicle.

10. The vehicle control device according to claim 1, wherein the controller is configured to prohibit control according to the attributes upon the space in the vehicle not being partitionable.

11. The vehicle control device according to claim 1, wherein the controller is configured to perform the air conditioning control upon either the attribute of the user or the attribute of the package including the information on the odor, the user and the package being objects each for loading in at least one of the partitioned spaces.

12. The vehicle control device according to claim 1, wherein the controller is configured to partition the space in the vehicle into the spaces and perform the air conditioning control prior to loading of at least one of the user and the package into the vehicle upon either the attribute of the user or the attribute of the package including the information on the odor.

13. A vehicle control method of a vehicle control device used for a vehicle that transports a user and a package, the vehicle control method comprising:
   acquiring an attribute of the user including information registered in advance on an odor in an interior of the vehicle and an attribute of the package including information registered in advance on an odor of the package;
   partitioning a space in the vehicle into spaces prior to loading of at least one of the user and the package into the vehicle; and
   performing air conditioning control according to the attribute of the user and the attribute of the package, the user and the package being objects each for loading in at least one of the partitioned spaces, and
   wherein the information is received by a controller from a communication device via a communication network,
   wherein the information is input by the user into the communication device, and wherein the communication device comprises a communication interface.

\* \* \* \* \*